United States Patent Office 3,717,639
Patented Feb. 20, 1973

3,717,639
PROCESS FOR THE PREPARATION OF 1-(2-NITRO-3,4-DI-LOWER-ALKOXYBENZYL)ISOQUINOLINES
John L. Neumeyer, Wayland, Mass., assignor to Arthur D. Little, Inc., Cambridge, Mass.
No Drawing. Filed May 4, 1967, Ser. No. 638,184
Int. Cl. C07d 35/28
U.S. Cl. 260—283 CN
14 Claims

ABSTRACT OF THE DISCLOSURE

A new process for the preparation of 1-(2-nitro-3,4-di-lower-alkoxybenzyl)isoquinolines, key intermediates used in the total synthesis of dl-apomorphine and dl-N-lower-alkylnorapomorphines, via novel 1-(2-nitro-3,4-di-lower-alkoxybenzyl)-1-cyano-2-benzoyl - 1,2 - dihydroisoquinolines.

---

This invention relates to a new process for the preparation of 1-(2-nitro-3,4-di-lower-alkoxybenzyl)isoquinolines having the formula:

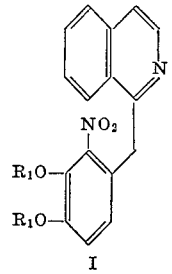

I and to 1-(2-nitro-3,4-di-lower-alkoxybenzyl)-1-cyano-2-benzoyl-1,2-dihydroisoquinolines having the formula:

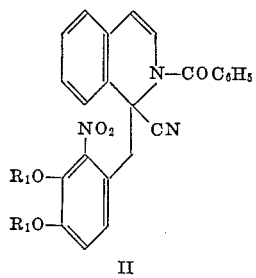

II which latter are useful as intermediates in the preparation of the compounds of Formula I, and where $R_1$ in both instances is lower-alkyl.

The compounds of Formula I are known generally to be useful as anti-spasmodics and coronary dilators, but also are useful in the practice of the present invention as intermediates for the synthesis of dl-apomorphine derivatives having the formula:

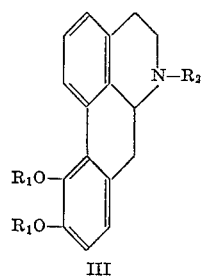

III where $R_1$ is hydrogen or lower-alkyl, and $R_2$ is lower-alkyl.

When $R_1$ and $R_2$ in the compounds of Formulas I, II, and III, represent lower-alkyl, the said lower-alkyl radical contains from one to about six carbon atoms and can be straight or branched. Thus $R_1$ and $R_2$ can be methyl, ethyl, n-propyl, isopropyl, n-butyl, n-pentyl, n-hexyl, and the like.

In the compounds of Formulas I, II, and III, the benzenoid ring of the isoquinoline moiety can also be further substituted by one or more substituents of low molecular weight and of such nature that they do not interfere with or take part in the reaction, to be described hereinafter, used to prepare the compounds. Examples of such substituents include lower-alkyl, halo, lower-alkoxy, lower-alkylmercapto, lower-alkylsulfonyl, trifluoromethyl, sulfamyl, methylenedioxy, benzyloxy, nitro, and the like.

The compounds of Formula I are useful as key intermediates for the synthesis of apomorphine derivatives, since they can be converted, by generally known reactions, to the corresponding 1-(2-amino-3,4-di-lower-alkoxybenzyl)-2-lower-alkyl-1,2,3,4 - tetrahydroisoquinolines of Formula IV:

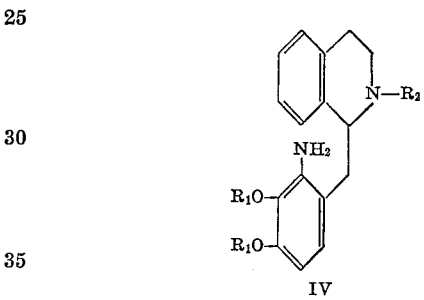

IV where $R_1$ and $R_2$ have the meanings given above, one derivative of which has been converted to dl-apomorphine dimethyl ether using the Pschorr cyclization [IV: $R_1$ and $R_2$ are $CH_3$, see Späth et al. Ber. 62, 325 (1929)]. However, the synthesis used by Späth et al. has since proved to be unreliable, since the initial reaction in the Späth synthesis, the Bischler-Napieralski cyclization of N-[α-(2-nitro-3,4-dimethoxyphenyl) - acetyl]phenethylamine, has failed in most instances to give the desired product, 1-(2-nitro-3,4-dimethoxybenzyl) - 3,4 - dihydroisoquinoline. [For example, see Hey et al. J. Chem Soc. 4123 (1956) and references cited therein]. Hence there is a need for a more reliable synthetic route to the compounds of Formula IV or to derivatives readily convertible to such compounds.

The present invention provides a convenient and reliable method for preparing the compounds of Formula I, which can be converted by known methods to the compounds of Formula IV, and thus obviates the disadvantages encountered in the Späth procedure for the synthesis of dl-apomorphine derivatives.

According to the process of the present invention, the compounds of Formula I are prepared by a two-step synthesis comprising first the alkylation of the Reissert's compound, 2-benzoyl-1,2-dihydro-1-isoquinaldonitrile, with a 2-nitro-3,4-di-lower-alkoxybenzyl halide followed by hydrolysis of the resulting 1-(2-nitro-3,4-di-lower-alkoxybenzyl)-1-cyano-2-benzoyl - 1,2 - dihydroisoquinoline according to the reactions:

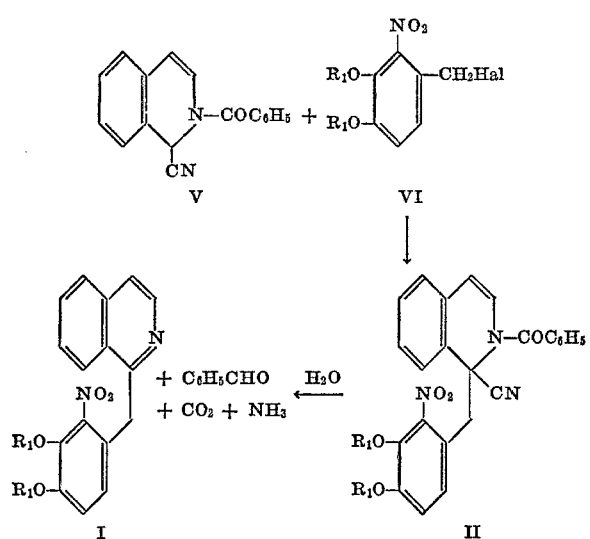

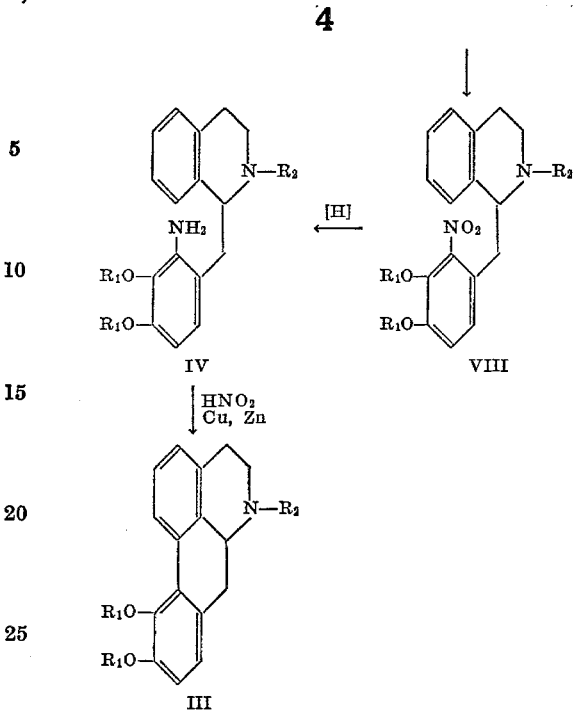

where $R_1$ represents lower-alkyl, and Hal represents halogen.

The alkylation reaction is preefrably carried out at temperatures in the range from 0–50° C. and in the presence of a strong base, for example, phenyl lithium, sodium hydride, sodamide, and the like, and in an organic solvent inert under the conditions of the reaction, for example, benzene, dioxane, dimethylformamide, and the like. A preferred basic catalysts is sodium hydride, and a preferred solvent is dimethylformamide.

The resulting 1-(2-nitro-3,4-di-lower-alkoxybenzyl)-1-cyano-2-benzoyl-1,2-dihydroisoquinoline of Formula II can be isolated and purified if desired, but no particular advantage is gained thereby, and it is preferred to hydrolyze the latter directly to the desired 1-(2-nitro-3,4-di-lower-alkoxybenzyl)isoquinolines of Formula I. The hydrolysis is carried out either in an aqueous or an alcoholic medium in the presence of a strong base, for example alkali metal hydroxides, and at temperatures in the range from 20–100° C. It is preferred to carry out the hydrolysis in an alcoholic medium in the presence of sodium or potassium hydroxide, at the reflux temperature of the mixture.

The compounds of Formula I thus prepared can be converted to dl-apomorphine di-lower-alkyl ethers having the general Formula III by generally known procedures, as indicated by the following reaction sequence where $R_1$ and $R_2$ represent lower-alkyl, and X represents halogen:

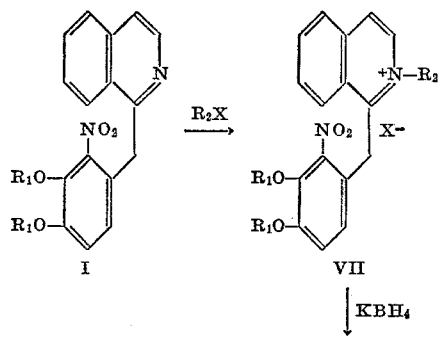

In the first step, the conversion of the 1-(2-nitro-3,4-di-lower-alkoxybenzyl)isoquinolines of Formula I to the lower-alkyl halide salts of Formula VII can be carried out in an excess of a halo-lower-alkane or in an organic solvent, for example, ethanol, isopropanol, acetone, and the like. The reaction generally takes place at room temperature, but it is usually advantageous to expedite the reaction by heating the reaction mixture at reflux temperature for several hours.

The resulting lower-alkyl halide salts of Formula VII are then reduced with potassium borohydride to effect reduction of the nitrogen-containing ring and to produce the tetrahydroisoquinoline derivatives of Formula VIII. The reaction is preferably carried out in a solvent inert under the conditions of the reaction, for example, water, methanol, ethanol, isopropanol, and the like, and at a temperature in the range from about 20° C. to about 100° C. A preferred solvent is aqueous ethanol.

Catalytic reduction of the resulting 1-(2-nitro-3,4-di-lower-alkoxybenzyl)-2-lower-alkyl - 1,2,3,4 - tetrahydroisoquinolines of Formula VIII with hydrogen affords the intermediate 1 - (2-amino-3,4-di-lower-alkoxybenzyl)-2-lower-alkyl - 1,2,3,4 - tetrahydroisoquinolines of Formula IV. The reduction is preferably carried out in a suitable organic solvent, for example, methanol, ethanol, isopropanol, and the like, over a catalyst suitable for the reduction of a nitro to an amino group, for example, palladium-on-charcoal, Raney nickel, or platinum oxide, and at hydrogen pressures in the range from 30 to 100 pounds p.s.i. It is preferred to carry out the reduction in a methanol or ethanol solvent over a palladium-on-charcoal catalyst.

The resulting 1-(2-amino-3,4-di-lower1-alkoxybenzyl)-2-lower-alkyl-1,2,3,4-tetrahydroisoquinolines of Formula IV are then cyclized to the desired dl-N-lower-alkylnorapomorphine di-lower-alkyl ethers of Formula III according to the method described by Pschorr et al., Ber. 35 4377 (1902), which comprises diazotizing an aqueous solution of the former in dilute mineral acid with sodium nitrite, and decomposing the resulting diazonium salt in the presence of copper powder and zinc dust. The diazotization reaction takes place at temperatures below about 5° C. while the decomposition of the diazonium salt generally takes place around room temperature.

Although dl-apomorphine dimethyl ether (III: $R_1$ and $R_2$ are $CH_3$) has been previously synthesized, for example by Späth et al. supra, the ether has never been cleaved to dl-apomorphine itself.

I have discovered that the dl-N-lower-alkylnorapomorphine di-lower-alkyl ethers of Formula III can be cleaved to the corresponding phenolic compounds ($R_1$ is H) by refluxing a solution of the ether derivatives in a solution of hydriodic acid in acetic anhydride, preferably under an atmosphere of nitrogen, according to the reaction:

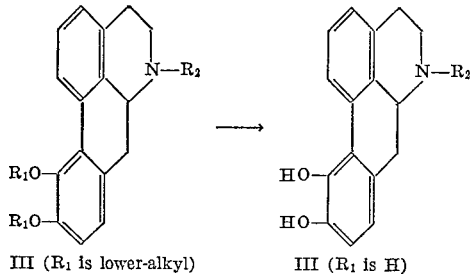

III ($R_1$ is lower-alkyl)    III ($R_1$ is H)

Thus it is another object of the present invention to provide the first total synthesis of dl-apomorphine and its N-lower-alkyl analogs.

The dl-apomorphine derivatives prepared by the instant process are well known for their emetic, hypnotic, and narcotic properties and are thus useful pharmacological agents for medicinal use.

The following examples will further illustrate the invention without the latter being limited thereto.

PREPARATION OF THE COMPOUNDS OF FORMULA I

EXAMPLE 1

2-benzoyl-1,2-dihydro-1-isoquinaldonitrile (V)

Isoquinoline, 97 g. (0.75 mole), was added to a solution of 136.5 g. (2.1 moles) of potassium cyanide in 500 ml. of water, and the mixture was stirred rapidly while 217.5 g. (1.5 moles) of benzoyl chloride was added over a period of thirty minutes. When addition was complete, the reaction mixture was stirred for an additional thirty minutes, cooled to room temperature, filtered, and the filtrate washed first with water, then with dilute hydrochloric acid, again with water, then with ethanol, and finally with ether giving 134.5 g. of 2-benzoyl-1,2-dihydro-1-isoquinaldonitrile, M.P. 125–126.5° C. [Rupe et al., Helv. Chim. Acta 22, 673 (1939) report M.P. 128° C.].

EXAMPLE 2

1-(2-nitro-3,4-dimethoxybenzyl)-1-cyano-2-benzoyl-1,2-dihydroisoquinoline (II: $R_1$ is $CH_3$)

To a stirred solution of 7.80 g. (0.03 mole) of 2-benzoyl-1,2-dihydro-1-isoquinaldonitrile in 7.65 g. (0.033 mole) of 2-nitro-3,4-dimethoxybenzyl chloride in 75 ml. of dimethylformamide was added 1.9 g. (0.043 mole) of a mineral oil dispersion of sodium hydride. The mixture was stirred for an hour and a half at room temperature, poured into 250 ml. of chloroform, and treated carefully with 250 ml. of water. The layers were separated, the aqueous layer extracted with chloroform, and the combined chloroform extracts were taken almost to dryness. The residue was treated with 350 ml. of absolute ethanol to complete the precipitation of the yellow crystalline product. A small amount of the suspension was filtered off giving 1-(2 - nitro-3,4-dimethoxybenzyl)-1-cyano-2-benzoyl-1,2-dihydroisoquinoline, M.P. 208–209° C.

Analysis.—Calcd. for $C_{26}H_{21}N_3O_5$ (percent): C, 68.56; H, 4.65; N, 9.23. Found (percent): C, 68.57; H, 4.73; N, 9.22.

EXAMPLE 3

1-(2-nitro-3,4-dimethoxybenzyl)isoquinoline (I: $R_1$ is $CH_3$)

The ethanol suspension containing the bulk of the 1-(2-nitro-3,4-dimethoxybenzyl)-1-cyano - 2 - benzoyl-1,2-dihydroisoquinoline prepared above in Example 2 was heated to reflux and treated with a solution of 5 g. (0.075 mole) of potassium hydroxide in 35 ml. of water. The resulting clear solution was heated under reflux for a half hour, taken to dryness under reduced pressure, and the residue dissolved in 150 ml. of chloroform and 100 ml. of water. The layers were separated, the aqueous layer extracted with chloroform, and the combined organic extracts were dried over sodium sulfate and concentrated in vacuo to a volume of about 50 ml. The mixture was diluted with 50 ml. of ethanol. Again the solution was reconcentrated to a small volume, and the procedure repeated once again. The solution was cooled to 0° C., and the solid which separated was washed with cold ethanol and dried giving 8.92 g. of 1-(2-nitro-3,4-dimethoxybenzyl)isoquinoline, M.P. 129–130° C. A small portion recrystallized from chloroformether gave material having M.P. 129–130° C.

Analysis.—Calcd. for $C_{18}H_{16}N_2O_4$ (percent): C, 66.66; H, 4.97; N, 8.64. Found (percent): C, 66.48; H, 4.88; N, 8.56.

1-(2 - nitro-3,4-dimethoxybenzyl)isoquinoline picrate gave M.P. 175–177° C. (dec.).

Synthesis of dl-apomorphine derivatives

EXAMPLE 4

(a) 1-(2-nitro-3,4-dimethoxybenzyl)isoquinoline methiodide (VII: $R_1$ and $R_2$ are $CH_3$)

1-(2-nitro-3,4-dimethoxybenzyl)isoquinoline was refluxed for fifteen to twenty hours with a twenty to thirty-fold excess of iodomethane, and the yellow crystalline solid which separated from the cooled reaction mixture was collected, washed with ether, and dried to give 1-(2-nitro-3,4-dimethoxybenzyl)isoquinoline methiodide, M.P. 190–193° C. (dec.). The melting point was unchanged after repeated recrystallizations from ethanol/water.

Analysis.—Calcd. for $C_{19}H_{19}IN_2O_4$ (percent): C, 48.94; H, 4.11; I, 27.22; N, 6.01. Found (percent): C, 48.89; H, 4.10; I, 27.25; N, 6.14.

(b) 1-(2-nitro-3,4-dimethoxybenzyl)isoquinoline propiodide (VII: $R_1$ is $CH_3$; $R_2$ is $C_3H_7$)

A solution of 3 g. (0.009 mole) of 1-(2-nitro-3,4-dimethoxy-benzyl)isoquinoline in 25 ml. of 1-iodopropane was refluxed for twenty hours, and the product which separated was collected from the cooled reaction mixture. One recrystallization from water gave material having M.P. 184–186° C.

Analysis.—Calcd. for $C_{21}H_{23}IN_2O_4$ (percent): C, 51.02; H, 4.69; I, 25.67; N, 5.67. Found (percent): C, 50.85; H, 4.72; I, 25.81; N, 5.51.

EXAMPLE 5

(a) 1-(2-nitro-3,4-dimethoxybenzyl)-2-methyl-1,2,3,4-tetrahydroisoquinoline (VIII: $R_1$ and $R_2$ are $CH_3$)

To an aqueous solution of about 0.55 g. (0.01 mole) of potassium borohydride was added a solution of 1.7 g. (0.0037 mole) of 1-(2-nitro-3,4-dimethoxybenzyl)isoquinoline methiodide in a mixture of 150 ml. of ethanol and 100 ml. of water. The mixture was stirred for forty-five minutes at 30° C., slowly heated to boiling, and allowed to reflux for one hour. Additional solid potassium borohydride was added in small portions to the refluxing reaction mixture until thin layer chromatograms indicated completion of the reaction. The solution was then refluxed for an additional hour, cooled to room temperature, and concentrated to dryness in vacuo. The residue was dissolved in water, adjusted to pH 9 by addition of 20% sodium hydroxide and extracted with ether. Drying of the ether extracts over magnesium sulfate, concentration of the extracts to dryness, and recrystallization of the residual solid first from hexane and then from petroleum ether/ethanol gave 1-(2-nitro-3,4-dimethoxybenzyl)-2- methyl-1,2,3,4-tetrahydroisoquinoline as yellow-green crystals, M.P. 97–98.5° C.

*Analysis.*—Calcd. for $C_{19}H_{22}N_2O_4$ (percent): C, 66.65; H, 6.48; N, 8.18. Found (percent): C, 66.74; H, 6.40; N, 8.15.

(b) 1-(2-nitro-3,4-dimethoxybenzyl)-2-propyl-1,2,3,4-tetrahydroisoquinoline (VIII: $R_1$ is $CH_3$; $R_2$ is $C_3H_7$)

1-(2 - nitro - 3,4 - dimethoxybenzyl)isoquinoline propiodide (3.7 g., 0.0075 mole), was reduced with aqueous potassium borohydride using the procedure described above in Exmple 5(a). The oily product obtained from the reaction mixture was recrystallized from petroleum ether to give 2 g. of 1-(2-nitro-3,4-dimethoxybenzyl)-2-propyl-1,2,3,4-tetrahydroisoquinoline as a slightly yellow powder, M.P. 74–76° C. One further recrystallization from petroleum ether gave material having M.P. 74.5–76° C.

*Analysis.*—Calcd. for $C_{21}H_{26}N_2O_4$ (percent): C, 68.09; H, 7.07; N, 7.56. Found (percent): C, 68.10; H, 6.97; N, 7.62.

EXAMPLE 6

(a) 1-(2-amino-3,4-dimethoxybenzyl)-2-methyl-1,2,3,4-tetrahydroisoquinoline (IV: $R_1$ and $R_2$ are $CH_3$)

1-(2-nitro-3,4-dimethoxybenzyl) - 2 - methyl - 1,2,3,4-tetrahydroisoquinoline (1.5 g., 0.0044 mole) was dissolved in 50 ml. of methanol and reduced with hydrogen in a Parr apparatus over 350 mg. of 5% palladium-on-charcoal catalyst. When reduction was complete, the mixture was filtered from the catalyst, concentrated to dryness, and the oily residue recrystallized from petroleum ether to give 1.1 g. of 1-(2-amino-3,4-dimethoxybenzyl)-2-methyl-1,2,3,4-tetrahydroisoquinoline as yellow crystals having M.P. 84–85.5° C. [Späth et al., Ber. 62, 325 (1929) isolated the compound as a brown syrup].

*Analysis.*—Calcd. for $C_{19}H_{24}N_2O_2$ (percent): C, 73.04; H, 7.74; N, 8.97. Found (percent): C, 73.16; H, 7.68; N, 8.95.

1-(2-amino-3,4-dimethoxybenzyl)-2 - methyl - 1,2,3,4-tetrahydroisoquinoline dipicrolonate, recrystallized from ethanol, gave M.P. 191–192° C. (dec.) and gave no depression on admixture with an authentic sample of M.P. 189–190° C. [Hey et al. J. Chem. Soc. 4123 (1956)].

(b) 1-(2-amino-3,4-dimethoxybenzyl)-2-propyl-1,2,3,4-tetrahydroisoquinoline (IV: $R_1$ is $CH_3$; $R_2$ is $C_3H_7$)

1-(2-nitro-3,4-dimethoxybenzyl) - 2 - propyl - 1,2,3,4-tetrahydroisoquinoline (1.5 g., 0.004 mole) was dissolved in 50 ml. of methanol and reduced with hydrogen over 250 ml. of 5% palladium-on-charcoal using the procedure described above in Example 6(a). The oily residue resulting from the reduction could not be induced to crystallize, and it was distilled in vacuo to give 0.95 g. of 1-(2-amino-3,4-dimethoxybenzyl)-2-propyl - 1,2,3,4,-tetrahydroisoquinoline, as a viscous pale yellow oil, B.P. 182° C./0.1 mm., $n_D^{25}=1.5761$.

*Analysis.*—Calcd. for $C_{21}H_{28}NO_2$ (percent): C, 74.08; H, 8,29; N, 8.23. Found (percent): C, 74.18; H, 8.38; N, 8.23.

1-(2-amino-3,4-dimethoxybenzyl) - 2 - propyl-1,2,3,4-tetrahydroisoquinoline pricrolonate, recrystallized from ethanol, gave M.P. 134.5–136° C.

*Analysis.*—Calcd. for $C_{31}H_{36}N_6O_7$ (percent): C, 61.58; H, 6.00; N, 13.90. Found (percent): C, 62.06; H, 6.16; N, 14.06.

EXAMPLE 7

(a) dl-Apomorphine dimethyl ether hydriodide (III: $R_1$ and $R_2$ are $CH_3$)

A solution of 1-(2-amino - 3,4 - dimethoxybenzyl)-2-methyl - 1,2,3,4 - tetrahydroisoquinoline (0.94 g., 0.003 mole) in 50 ml. of 1 N sulfuric acid at 2° C. was treated dropwise over a period of fifteen minutes with stirring with 17 ml. of 0.2 N sodium nitrite until a positive test for nitrous acid was obtained on starch-iodide paper. The solution was stirred for an additional fifteen minutes at 23° C., treated with 1.0 g. of copper powder, and stirred for twenty-two hours under nitrogen at room temperature. The solution was then filtered, the filtrate treated with 1.0 g. of zinc dust and 10 ml. of 1 N sulfuric acid, heated on a steam bath for fifteen minutes and filtered. The filtrate was basified with concentrated ammonium hydroxide, extracted with ether, and the ether extracts were combined, washed with dilute sodium hydroxide, dried over sodium sulfate, and taken to dryness. The residual brown oil was dissolved in a minimum amount of chloroform and chromatographed on a column of 20 g. of Adsorbosil®. The column was eluted with a solvent varying from pure benzene to pure chloroform, the product being removed with chloroform. The first 375 ml. of chloroform eluate was collected and evaporated to dryness to give 305 mg. of dl-apomorphine dimethyl ether as a brown oil. The latter was converted to its hydriodide salt in absolute ethanol, and the salt recrystallized from acetone/water to give dl-apomorphine dimethyl ether hydriodide, M.P. 279° C. (dec.).

*Analysis.*—Calcd. for $C_{19}H_{22}INO_2$ (percent): C, 53.91; H, 5.24; I, 29.98; N, 3.31. Found (percent): C, 54.08; H, 5.40; I, 30.17; N, 3.13.

The oily base also yielded a picrate, M.P. 187–189° C. (dec.) and a perchlorate, M.P. 263° C.

(b) dl-N-propylnorapomorphine dimethyl ether hydriodide (III: $R_1$ is $CH_3$; $R_2$ is $C_3H_7$) was prepared from 5.10 g. (0.015 mole) of 1-(2-amino-3,4-dimethoxybenzyl)-2-propyl -1,2,3,4-tetrahydroisoquinoline using the procedure described above in Example 7(a). There was thus obtained 1.85 g. of dl-N-propylnorapomorphine dimethyl ether as an oil which was converted to its hydriodide salt. The latter was recrystallized from ethanol/ether to give dl-N-propylnorapomorphine dimethyl ether hydroiodide, M.P. 245° C.

*Analysis.*—Calcd. for $C_{21}H_{26}INO_2$ (percent): C. 55.88, H, 5.81; I, 28.12; N, 3.10. Found (percent): C, 56.00; H, 5.94; I, 28:30; N, 3.07.

A small amount of the hydriodide salt was used to liberate the free base which crystallized on standing to give dl-N-propylnorapomorphine dimethyl ether as a pale yellow solid, M.P. 132–133° C.

EXAMPLE 8

(a) dl-Apomorphine hydroiodide (III: $R_1$ is H; $R_2$ is $CH_3$)

To a stirred mixture of 1.04 g. (0.0025 mole) of dl-apomorphine dimethyl ether hydriodide partly dissolved in 4.0 ml. (0.03 mole) of 57% hydriodic acid was added 2.9 ml. (0.031 mole) of acetic anhydride. The reaction mixture was heated under reflux in an oil bath at 150° C. for one hour and then cooled to room temperature under nitrogen. The reaction mixture was diluted with 15 ml. of ether, and the solid which separated was collected and washed copiously with ether. Recrystallization of the crude material from ethanol/ether gave dl1apomorphine hydriodide, M.P. 282° C. (dec.)

*Analysis.*— Calcd.for $C_{17}H_{18}INO_2$ (percent): C, 51.66; H, 4.59; I, 32.11; N, 3.54. Found (percent): C, 51.48; H, 4.69; I, 32.00; N, 3.40.

(b) dl-N-propylnorapomorphine hydriodide—(III: $R_1$ is H; $R_2$ is $C_3H_7$) was prepared from dl-N-propylnorapomorphine dimethyl ether in 95% yield using the procedure described about in Example 8(a). The product was recrystallized from ethanol/ether to give dl-N - propylnorapomorphine hydriodide, 278° (dec).

*Analysis.*—Calcd. for $C_{19}H_{22}INO_2$ (percent): C, 53.91; H, 5.24; I, 29.98; N, 3.31. Found (percent): C, 53.93; H, 5.41; I, 30.05; N, 3.15.

I claim:
1. The process for preparing a 1-(2-nitro-3,4-di-lower-alkoxybenzyl) - 1 - cyano-2-benzoyl-1,2-dihydroisoquinoline which comprises reacting 2-benzyl-1,2-dihydro-1-isoquinaldonitrile with a 2-nitro-3,4-di-lower-alkoxybenzyl halide in the presence of a strong base.

2. The process according to claim 1 for preparing 1-(2-nitro-3,4 - dimethoxybenzyl)-1-cyano - 2 - benzoyl-1,2-dihydroisoquinoline which comprises reacting 2-benzoyl-1,2-dihydro-1-isoquinaldonitrile with 2-nitro-3,4 - dimethoxybenzyl chloride in the presence of sodium hydride.

3. The process for preparing a 1-(2-nitro-3,4-di-lower-alkoxybenzyl)isoquinoline which comprises hydrolyzing a 1-(2-nitro-3,4 - di - lower-alkoxybenzyl)-1-cyano-2-benzoyl-1,2-dihydroisoquinoline with aqueous alkali.

4. The process according to claim 3 for preparing 1-(2-nitro-3,4-dimethoxybenzyl)isoquinoline which comprises hydrolyzing 1-(2-nitro-3,4-dimethoxybenzyl) - 1 cyano-2-benzyl-1,2-dihydroisoquinoline with aqueous alkali.

5. The process for preparing a 1-(2-nitro-3,4-di-lower-alkoxybenzyl)isoquinoline which comprises reacting 2-benzoyl-1,2-dihydro-1-isoquinaldonitrile with a 2 - nitro-3,4-di-lower-alkoxybenzyl halide in the presence of a strong base; and hydrolyzing the resulting 1-(2-nitro-3,4-di-lower-alkoxybenzyl) - 1 - cyano-2-benzoyl-1,2-dihydro-isoquinoline with aqueous alkali.

6. The process according to claim 5 for preparing 1-(2-nitro-3,4-dimethoxybenzyl)isoquinoline which comprises reacting 2-benzoyl-1,2-dihydro-1-isoquinaldonitrile with 2-nitro-3,4-dimethoxybenzyl chloride in the presence of sodium hydride; and hydrolyzing the resulting 1-(2-nitro-3,4-dimethoxybenzyl)-1-cyano-2-benzoyl - 1,2 - dihydroisoquinoline with aqueous alkali.

7. The process for preparing a compound having the formula:

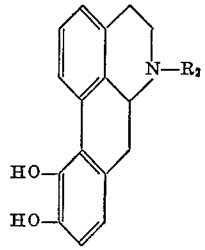

wherein $R_2$ is lower-alkyl, which comprises reacting a compound having the formula:

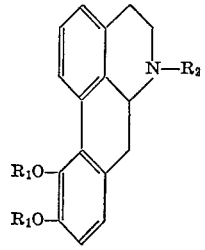

where $R_1$ is lower-alkyl and $R_2$ has the meaning given above with hydriodic acid in acetic anhydride.

8. The process according to claim 7 for preparing dl-apomorphine which comprises reacting dl-apomorphine dimethyl ether with hydriodic acid in acetic anhydride.

9. The process according to claim 7 for preparing dl-N-propylnorapomorphine which comprises reacting dl-N-propylnorapomorphine dimethyl ether with hydriodic acid in acetic anhydride.

10. The process for preparing a compound having the formula:

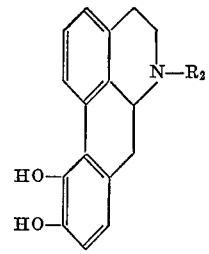

wherein $R_2$ is lower-alkyl which comprises the steps: reacting 2-benzoyl-1,2-dihydro-1-isoquinaldonitrile with a 2-nitro-3,4-di-lower-alkoxybenzyl halide in the presence of a strong base; hydrolyzing the resulting 1-(2-nitro-3,4-di-lower-alkoxybenzyl) - 1 - cyano - 2 - benzoyl-1,2-dihydroisoquinoline with aqueous alkali; reacting the resulting 1-(2-nitro - 3,4 - di-loweralkoxybenzyl)isoquinoline with a halo-lower-alkane; reducing the resulting 1-(2-nitro-3,4-di-lower - alkoxybenzyl)isoquinoline lower-alkyl halide salt with potassium borohydride; reducing with hydrogen in the presence of a catalyst the resulting 1-(2-nitro-3-di-lower-alkoxybenzyl) - 2 - lower - alkyl-1,2,3,4-tetrahydroisoquinoline; diazotizing the resulting 1 - (2-amino - 3,4-di-lower-alkoxybenzyl)-2-lower-alkyl-1,2,3,4-tetrahydroisoquinoline with sodium nitrite in the presence of dilute mineral acid, and decomposing the resulting diazonium salt in the presence of copper powder and zinc dust; and reacting the resulting dl-apomorphine di-lower-alkyl ether or dl-N-lower-alkylnorapomorphine di-lower-alkyl ether with hydriodic acid in acetic anhydride.

11. The process according to claim 10 for preparing dl-apomorphine which comprises: reacting 2-benzoyl-1,2-dihydro-1-isoquinaldonitrile with 2-nitro-3,4-dimethoxybenzyl chloride in the presence of sodium hydride; hydrolyzing the resulting 1-(2-nitro-3,4-dimethoxybenzyl)-1-cyano-2-benzoyl-1,2-dihydroisoquinoline with aqueous alkali; reacting the resulting 1-(2-nitro-3,4-dimethoxybenzyl)isoquinoline with iodomethane; reducing the resulting 1-(2-nitro - 3,4 - dimethoxybenzyl)isoquinoline methiodide with potassium borohydride; reducing with hydrogen in the presence of a catalyst the resulting 1-(2-nitro - 3,4 - dimethoxybenzyl)-2-methyl-1,2,3,4-tetrahydroisoquinoline; diazotizing the resulting 1-(2-amino-3,4-dimethoxybenzyl) - 2 - methyl-1,2,3,4-tetrahydroisoquinoline with sodium nitrite in the presence of dilute mineral acid, and decomposing the resulting diazonium salt in the presence of copper powder and zinc dust; and reacting the resulting dl-apomorphine dimethyl ether with hydriodic acid in acetic anhydride.

12. The process according to claim 10 for preparing dl-N-propylnorapomorphine which comprises: reacting 2-benzoyl-1,2-dihydro-1-isoquinaldonitrile with 2-nitro-3,4-dimethoxybenzyl chloride in the presence of sodium hydride; hydrolyzing the resulting 1-(2-nitro-3,4-dimethoxybenzyl)-cyano - 2 - benzoyl-1,2-dihydroisoquinoline with aqueous alkali; reacting the resulting 1-(2-nitro-3,4-dimethoxybenzyl)isoquinoline with 1-iodopropane; reducing the resulting 1-(2-nitro-3,4-dimethoxybenzyl)isoquinoline propiodide with potassium borohydride; reducing with hydrogen in the presence of a catalyst the resulting 1-(2-nitro-3,4-dimethoxybenzyl)-2-propyl - 1,2,3,4 - tetrahydroisoquinoline; diazotizing the resulting 1-(2-amino-3,4 - dimethoxybenzyl) - 2 - propyl - 1,2,3,4 - tetrahydroisoquinoline with sodium nitrite in the presence of dilute mineral acid, and decomposing the resulting diazonium salt in the presence of copper powder and zinc dust; and reacting the resulting dl-N-propylnorapomorphine dimethyl ether and hydriodic acid in acetic anhydride.

13. A compound having the formula:
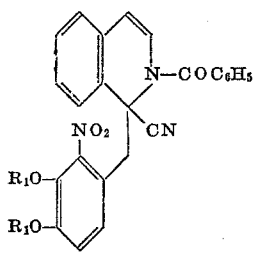
wherein $R_1$ is lower-alkyl.
14. 1-(2-nitro-3,4-dimethoxybenzyl) - 1 - cyano-2-benzoyl-1,2-dihydroisoquinoline according to claim 13 where $R_1$ is methyl.
References Cited
McEwen et al., Chem. Reviews, vol. 55, pp. 511 and 528 to 530 (1955).
Weisbach et al., J. Med. Chem., vol. 6, pp. 91 to 97 (1963).
Knabe et al., Naturwissenschaften, vol. 48, p. 669 (1961).
LELAND A. SEBASTIAN, Primary Examiner
U.S. Cl. X.R.
260—285, 287 R, 289 R, 999; 424—258

UNITED STATES PATENT OFFICE
CERTIFICATE OF CORRECTION

Patent No. 3,717,639                    Dated February 20, 1973

Inventor(s) John L. Neumeyer

It is certified that error appears in the above-identified patent and that said Letters Patent are hereby corrected as shown below:

Col. 10, line 29, change "nitro-3-di-lower-alkoxybenzyl)" to read "nitro-3,4-di-lower-alkoxybenzyl)".

Signed and sealed this 20th day of November 1973.

SEAL)
ttest:

DWARD M. FLETCHER, JR.                  RENE D. TEGTMEYER
ttesting Officer                        Acting Commissioner of Patents